United States Patent [19]

Grunwald et al.

[11] Patent Number: 5,452,867
[45] Date of Patent: Sep. 26, 1995

[54] SHELL STRUCTURAL COMPONENT MADE OF FIBER COMPOSITE MATERIAL

[75] Inventors: Gero Grunwald, Hamburg; Michael Hauschildt, Jork, both of Germany

[73] Assignee: Deutsche Aerospace Airbus GmbH, Hamburg, Germany

[21] Appl. No.: 134,533

[22] Filed: Oct. 8, 1993

[30] Foreign Application Priority Data

Oct. 9, 1992 [DE] Germany ............ 42 34 038.1

[51] Int. Cl.[6] .................................. B64B 1/14
[52] U.S. Cl. ................. 244/117 R; 244/129.4; 244/133; 428/137; 428/105; 428/65.1; 156/293; 156/253; 156/173; 220/588
[58] Field of Search ............... 244/117 R, 119, 244/123, 131, 132, 133, 129.4; 428/133, 65, 105–109; 156/293, 253, 173; 220/588–590

[56] References Cited

U.S. PATENT DOCUMENTS

| 2,383,200 | 8/1945 | Kraner et al. | 244/129.4 |
| 2,392,835 | 1/1946 | Conlon | 244/129.4 |
| 3,260,398 | 7/1966 | Levenetz | 220/590 |
| 3,578,526 | 3/1971 | Harding | 244/133 |
| 3,946,127 | 3/1976 | Eisenmann et al. | 244/133 |
| 4,230,293 | 10/1980 | Hann et al. | 244/133 |
| 4,507,011 | 3/1985 | Brown | 244/132 |
| 4,556,591 | 12/1985 | Bannick, Jr. | 244/133 |
| 4,614,279 | 9/1986 | Toth et al. | 220/590 |
| 4,697,324 | 10/1987 | Grant et al. | 244/131 |
| 4,811,540 | 3/1989 | Kallies et al. | 244/123 |

*Primary Examiner*—Galen L. Barefoot
*Attorney, Agent, or Firm*—W. G. Fasse; W. F. Fasse

[57] ABSTRACT

An aircraft structure, such as a wing, is made of fiber composite material and includes a shell structural component also made of fiber composite material. The structural component has at least one access opening closeable by a cover. The shell structural component has a first area containing the access opening closeable by the cover. In the longitudinal direction of the wing the first area is predominantly flexible while a second area surrounding the first area is predominantly stiff, whereby these areas take up different longitudinally effective forces, relative to the length of the wing. Both areas are capable of transferring shear forces in the same manner.

11 Claims, 3 Drawing Sheets

SHELL STRUCTURAL COMPONENT MADE OF FIBER COMPOSITE MATERIAL

FIELD OF THE INVENTION

The invention relates to a shell structural component or unit made of fiber composite material for use in aircraft structures. Such components are part, for example, of an aircraft wing, and include at least one access opening closeable by a removable cover, for example for maintenance work.

BACKGROUND INFORMATION

Frequently the assembly, maintenance, and repairing of structures and systems inside of aircraft wings, for example, make it necessary that access openings are provided in the respective shell structural components. The respective access can be provided by manholes, handholes, or by removable shell sections. Generally, a manhole is cut into a lower wing shell of a wing formed by upper and lower wing shells. For the construction of access openings with a cover, the following construction principles are basically useable.

First, there are so-called no-load carrying manhole covers. Such no-load covers distinguish themselves by the following advantages. It is easy to assemble and disassemble the cover, there is no need for a heavy load carrying cover, the accessibility is good, and there are no bore holes in the load carrying wing skin. However, there is the disadvantage that such a structure is the heaviest of all possible structures of this type. This weight problem is due to the unavoidable fact that additional supporting material in the wing is necessary to lead present forces around the opening. Thus, the cover itself may not be too heavy, but the wing and cover together become heavier.

Second, there are load carrying covers which distinguish themselves by the following advantages. Load carrying covers result in a lighter-in-weight structure compared to structures with no-load carrying covers, because normal- and shear forces can be transmitted totally or partially by the covers. Load carrying covers are not dead weight. Last, but not least, the force flow is less disturbed than in structures with a no-load carrying cover. However, load carrying covers have the following disadvantages. The assembly and disassembly is difficult because of the large number of connecting elements. Force transmission by screw connections has difficulties of its own. In the root zone of a wing two or three lines of screw connections are necessary.

Third, there are load carrying shell elements which are part of a structure in which one or several shell elements, e.g. panels, including the respective stringers are constructed to be dismantable for providing the necessary access. Such shell element construction has the following advantages. Most favorable low weight solutions can be realized. The force flow or transmission is disturbed the least and the respective panels do not constitute dead weight. Besides, in comparison to all other constructions an optimal access is possible.

However, load carrying shell elements have the following disadvantages. Because of the necessary stringer couplings substantial problems occur in the assembly or disassembly. The weakening of a wing when a panel section is removed can possibly require a support of the wing during maintenance work or the like. Difficulties occur at the cross-butt joints of the panels concerning the force transmission. Large normal forces act on panels of this kind, which have to be transmitted.

OBJECTS OF THE INVENTION

In view of the foregoing it is the aim of the invention to achieve the following objects singly or in combination:

to create a shell construction component for an airplane structure made of fiber composite material with at least one access opening closeable by a cover that has the above advantages of a load carrying panel but at the same time avoiding its disadvantages;

to take advantage of the anisotropic mechanical properties of fiber composite materials depending on the fiber orientation in such materials; and to optimally adapt the fiber orientation to the intended force or load carrying ability in different areas of an aircraft wing.

SUMMARY OF THE INVENTION

A shell structural component of the above mentioned type is characterized according to the invention in that the shell structure has two areas, including a first area which includes an access opening with a cover, and a second area which surrounds or contains the first area. Said first area has a low stiffness in the longitudinal wing direction, said second area has a high stiffness in said longitudinal wing direction, whereby said first and second areas have different force transmitting characteristics with regard to forces in parallel to the longitudinal axis of the respective structural component, namely with regard to tensile and compressive forces. Both areas, however, have a roughly equal stiffness relative to shear forces. That means, for shear forces there is a similar force transmitting characteristic in both areas. The different elastic behavior of both areas is created by a corresponding lamination and orientation of the fiber reinforcing material in the matrix of the composite material so that corresponding different moduli of elasticity, E-moduli in short, are achieved in the first and second areas. However, the G-moduli or shear moduli are roughly equal in the first and second areas.

According to the invention, the first area, which includes the access opening, has the lower E-modulus and so only takes up a small portion of the total longitudinal force effective for the total structural component while the second area surrounding the first area, has the higher E-modulus, whereby the second area is able to take up a larger portion of said total effective longitudinal force. In comparison to conventional shell constructions with a homogeneous E-modulus, the structure of the invention carries the same total load caused by the longitudinally effective forces, however, by a different, more efficient distribution of the longitudinal forces in the different areas. The shear forces, however, can be carried by the first and second areas in the same manner, so that no loss of shear stiffness occurs compared to an undisturbed structure without an access opening.

It is a special advantage of the structure according to the invention that, compared to conventional structures, material has been saved, resulting in a considerable reduction in weight and costs.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
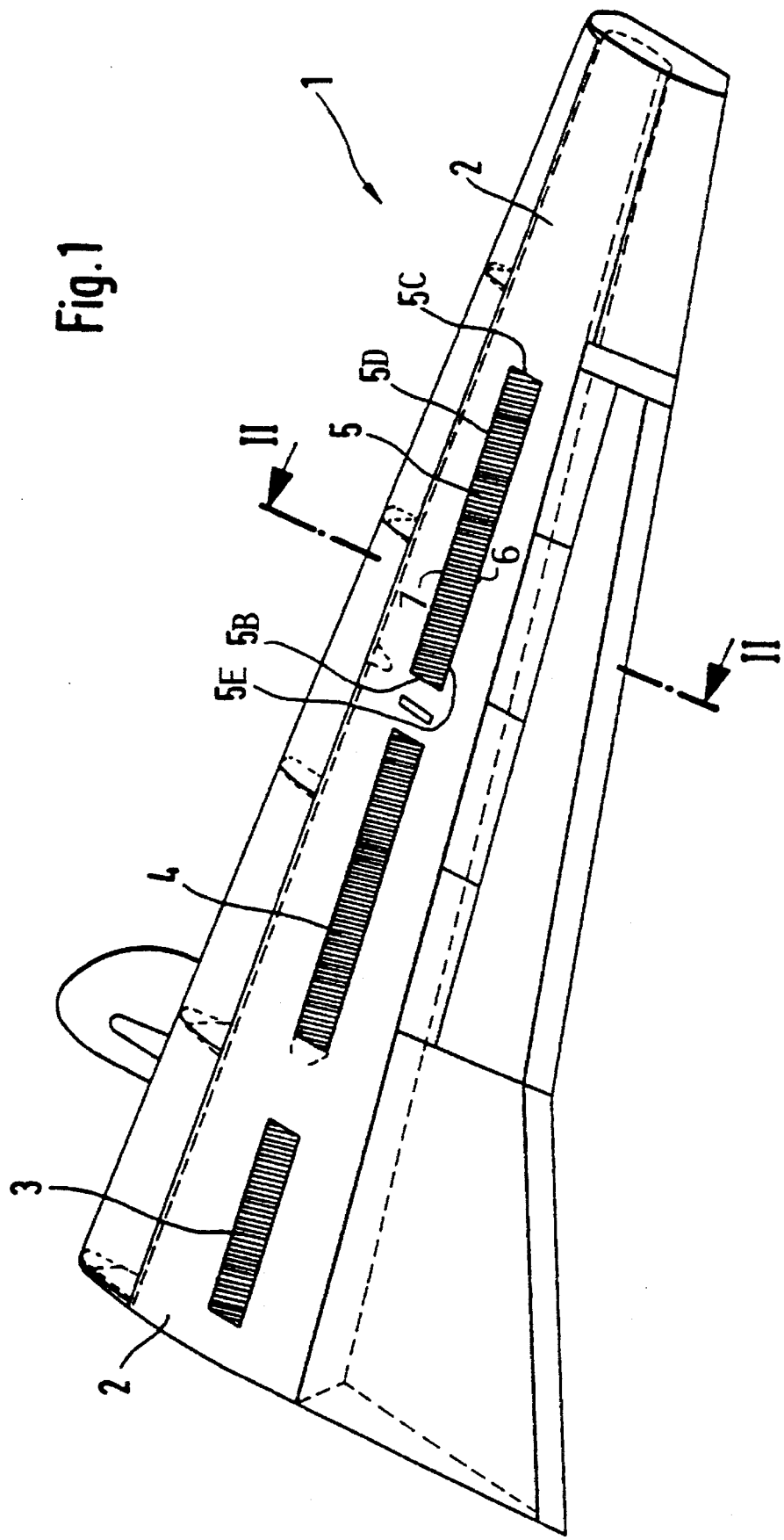
FIG. 1 shows schematically a perspective view of an airplane wing with separable panels.
Figure 2:
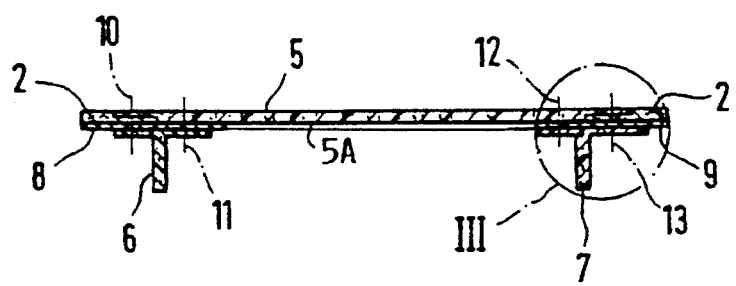
FIG. 2 shows on an enlarged scale a partial sectional view along section line II—II in FIG. 1.

FIGS. 1 and 2 show an aircraft wing 1 with an upper shell 2, in which there are three access openings shut by covers 3, 4, 5. The covers 3, 4, 5 are constructed as separable panels, which are mounted in place by screw connections shown symbolically by vertical lines, indicating rows of screws or rivets 10, 11, 12, and 13 in FIG. 2. The upper shell 2 is strengthened on its interior side by several stringers 6, 7 running lengthwise of the wing 1 as shown in FIG. 2. Between the stringers 6 and 7 there is an access opening 5A shut by the cover 5. The cover 5 is separably connected to the upper shell 2 in the region of the cross-joints 5B and 5C as well as the longitudinal joints 5D and 5E. A lengthwise running reinforcement 8 or 9, respectively, is laminated between each of the stringers 6 and 7 and the upper shell 2. Thus, the stringers 6 and 7, the reinforcements 8 and 9, and the upper shell 2 form a monolithically connected structure in which the just mentioned elements are bonded to one another by the curing of the matrix material of the fiber composite material. The cover 5 is secured to this structure by the above mentioned rows of screws or rivets 10, 11, 12, and 13.

Figure 3:
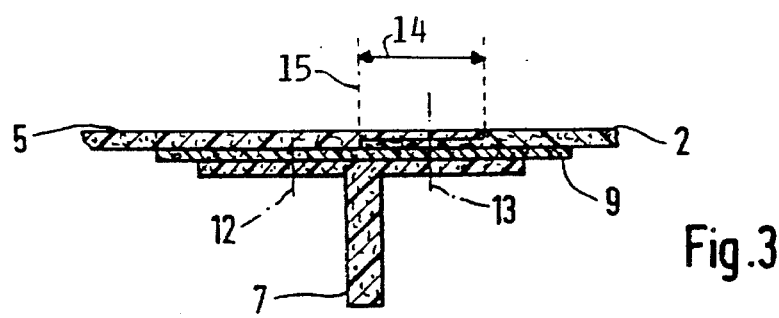
FIG. 3 shows on an enlarged scale the detail III according to FIG. 2.

FIG. 3 shows the detail III according to FIG. 2 in the area of the longitudinal joint 5D with the stringer 7, the upper shell 2, the reinforcement 9 and the cover 5. The upper shell 2 and the cover 5 have the same wall thickness, whereby these wall thicknesses are halved in the zone of the mutual overlap 14. The cover is screwed tight to the stringer 7 and the reinforcement 9 in the area of the row of screws 12. The row of screws or rivets 13 is arranged in the area of the overlap 14. The joints or connections of the cover 5 to the upper shell 2 are constructed in the same way as just described along the crossjoints 5B and 5C. Due to the reinforcements 8, 9 in the region of the longitudinal joints 5D and 5E the structure, which surrounds the access opening 5A, is so dimensioned that it takes up primarily longitudinal forces. As a result the cover 5 is relieved of these longitudinal forces. Therefore, the cover 5 is predominantly constructed for the transferring of shear forces. This construction is achieved by orienting the reinforcing fibers substantially with a ±45° fiber orientation compared to the longitudinal, horizontal direction.

The above described construction of the access opening 5 with a cover of the approximate dimensions of a panel is characterized by the following features or characteristics.

The laminate of the cover 5 comprising layers with reinforcing fibers predominantly oriented at ±45° is substantially less sensitive regarding its stability, e.g. against buckling, than the material used in a conventional structure with a homogenous E-modulus. Force transmitting stringer couplings between cover and shell, or between two half covers have become unnecessary. Stiffening elements for increasing the buckling stiffness of the cover do not need a force locking, i.e. a force transmitting connection to the shell 2 nor are connections needed between two half covers. A cover 5 or a panel, respectively, is easier to be subdivided into several panel segments or sections, because the respective cross-butt joints, due to the reduced loads, require for their construction merely a fraction of the effort and expense, which was usual heretofore.

In those instances where the required work or maintenance do not require large access openings with a separable cover, which has the dimensions of an entire panel, smaller access holes can be provided. Thus, another embodiment of the invention provides a panel in which the normal force is reduced in the aforementioned manner, whereby the panel is connected by rivets to the surrounding structure, wherein the panel is provided with smaller access openings such as handholes or, if required, also manholes which are still substantially smaller than a whole panel. These holes are shut by separable connected corresponding covers. In such a panel with holes therein, only reduced longitudinal forces are effective as compared to the surrounding structure, it is advantageous, that the fastening of the respective handhole covers can be realized with a relatively low effort and expense.

Figure 4:
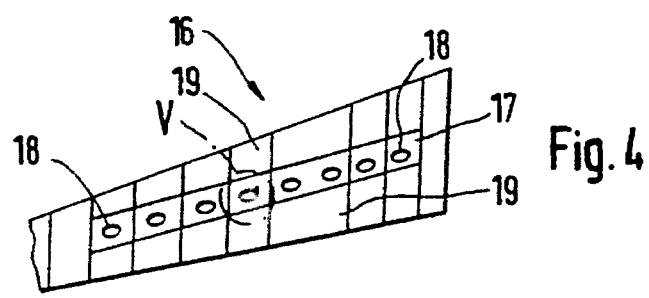
FIG. 4 shows schematically a plan view into an airplane wing with manholes in the lower wing shell with the upper wing shell removed.
Figure 5:
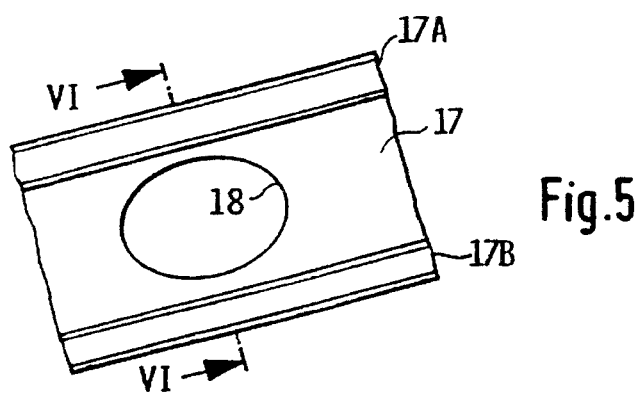
FIG. 5 shows on an enlarged scale the detail V according to FIG. 4.

FIGS. 4 and 5 schematically show a plan view into a lower wing shell 19 of a wing 16 with a panel 17 having several manholes 18 therein. The panel 17 is a monolithic part of the wing shell 19. The wing shell 19 is constructed as a normal force reducing plate because of a ±45° orientation of the reinforcing fibers in the composite material. Instead of a clearly discernible transition between the normal wing shell and the panel 17 held together by screw- or rivet joints, both areas merge smoothly, so that there is not sharp boundary between the two laminates. Here the term "panel" rather means a panel-like area covering member which does not have sharply discernible edges relative to the lower wing shell 19. The transition area between the panel 17 and the lower wing shell 19 may have several different structures as shown in FIGS. 5, 6, and 7 to be described below.

FIG. 5 shows two longitudinal reinforcing ribs 17A and 17B in the transition area between the panel 17 and the lower wing shell 19.

Figure 6:
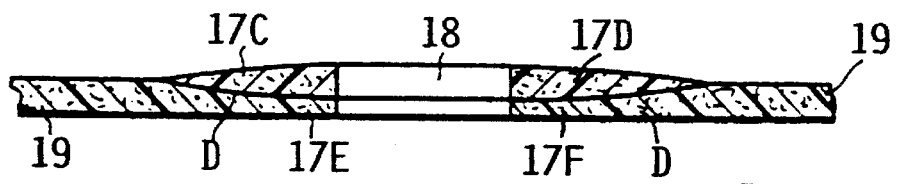
FIG. 6 is a sectional view along section line VI—VI in FIG. 5 showing a longitudinal reinforcing rib construction.
Figure 7:
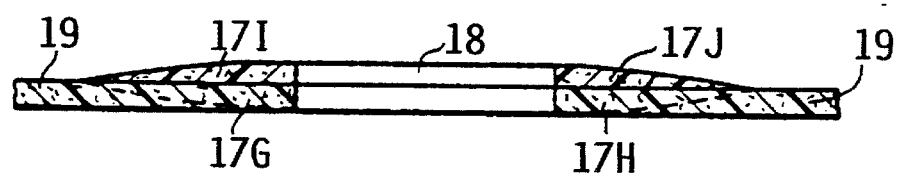
FIG. 7 is a sectional view similar to that of FIG. 6, showing a modification of the longitudinal reinforcing ribs.
Figure 8:
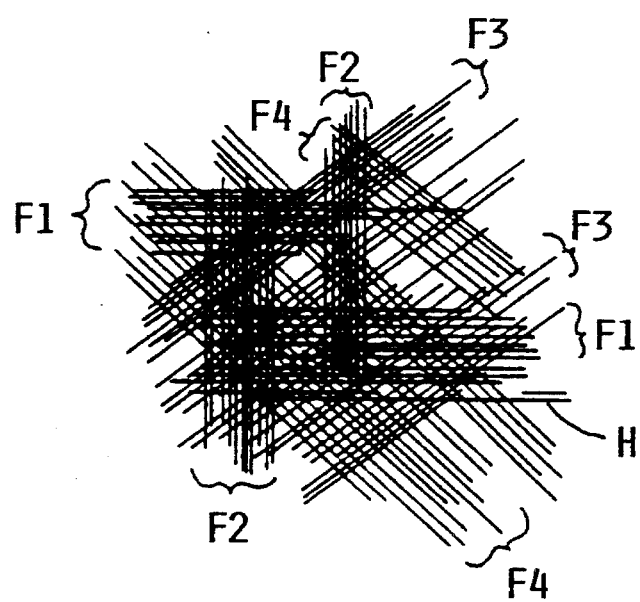
FIG. 8 illustrates different orientations relative to the horizontal of the reinforcing fibers in the composite.

Referring first to FIG. 8, before describing FIGS. 6 and 7, the various fiber orientations are illustrated in FIG. 8. The fiber orientation refers to the layers of fibers in the composite material as used acocrding to the invention. The fiber orientation is considered relative to a horizontal line H. Fibers F1 have a 0°-orientation since the fibers F1 run in parallel to the horizontal H. Fibers F2 have a 90°-orientation since the fibers F2 extend perpendicularly to the horizontal H. Fibers F3 have a +45° orientation since the fibers F3 extend with an upward left to right slope of 45°. Fibers F4 have a −45°-orientation since the fibers F4 extend with a downward slope from left to right.

FIG. 6 shows a construction in which the lower wing shell 19 is formed or laminated to include, away from the manhole 18, layers with a 90° fiber orientation, layers with a ±45°-orientations, and layers with a 0°-orientation. However, next to the manhole 18 the layers with a 0°-fiber orientation are omitted to form a depression D to the right and left of the hole 18. The areas 17E and 17F next to the hole 18 comprise only fiber orientations of ±45° or a few layers with a 90° fiber orientation. The reinforcement 17C and 17D next to the hole 18 are then layered to satisfy the present teaching regarding the different moduli of elasticity.

FIG. 7 shows an embodiment, wherein the lower wing shell 19 does not form a depression in the areas 17G and 17H next to the hole 18. Instead, the reinforcements 17I and 17J are modified compared to the shape of the reinforcements 17C and 17D in FIG. 6. In FIG. 7 the depression is avoided because even though fiber layers with a 0°-orientation also end in the marginal region away from the hole 18, the 0°-orientation fiber layers have been replaced in the areas 17G and 17H by ±45° fiber orientation layers so that no depression is formed, whereby in a layered ply immediately next to the holes 18, a different fiber orientation prevails, compared to the other fibers of the layered ply further away from the holes 18. As a result, the covers for the access holes 18 and the panel 17 are realized in such a way that the covers and the plate are substantially dimensioned to transfer shearing forces. This solution according to the invention offers all known advantages of conventional manhole arrangements of this type, namely, the covers are easy to assemble and disassemble, no support of the wing is necessary during work on the wing, there is a good accessibility, and no bores are required in the wing skin, whereby the wing is not weakened. Further, the essential disadvantages of conventional manhole arrangements which are primarily to be seen in the large weight of the conventional structures, has been avoided altogether by the invention.

Although the invention has been described with reference to specific example embodiments, it will be appreciated that it is intended to cover all modifications and equivalents within the scope of the appended claims.

What we claim is:

1. An aircraft construction comprising a shell structure made of fiber composite material, said shell structure including reinforcing members and a skin supported by said reinforcing members, said skin including at least one access opening and a cover for said access opening, said skin of said shell structure comprising a first area wherein said access opening and said cover are located, said first area having a first construction of a fiber reinforced lamination having a first modulus of elasticity that permits yielding in a longitudinal direction of said aircraft structure, said skin of said shell structure further comprising a second area surrounding said first area, said second area including a second construction of a further fiber reinforced lamination having a second modulus of elasticity which is higher than said first modulus of elasticity of said first area, so that said second area is stiff in said longitudinal direction relative to a longitudinally effective force, so that said first area and said cover take up only a small proportion of a total longitudinally effective force applied to said fiber composite aircraft construction, and so that said second area takes up a larger proportion of said applied, longitudinally effective force, thereby substantially relieving said cover of said longitudinally effective force.

2. The aircraft construction of claim 1, wherein said cover is a separable cover panel, said aircraft construction comprising screw connections for securing said separable cover panel to said aircraft construction.

3. The aircraft construction of claim 1, wherein said shell structure of fiber composite material is mounted by rivets to said aircraft structure.

4. The aircraft construction of claim 1, wherein said shell structure of fiber composite material forms a panel which is a monolithic, integral part of said aircraft construction.

5. The aircraft construction of claim 2, wherein said separable cover panel comprises said at least one access opening closeable by said cover.

6. The aircraft construction of claim 1, wherein said fiber composite material of said shell structure comprises reinforcing fibers having a substantially 0°-fiber orientation.

7. The aircraft construction of claim 1, wherein said cover is made of fiber composite material including reinforcing fibers with a ±45° fiber orientation.

8. The aircraft construction of claim 4, wherein said monolithic panel forming said integral part of said aircraft construction comprises said at least one access opening closeable by said cover.

9. The aircraft construction of claim 1, wherein said shell structure is part of an aircraft wing.

10. The aircraft construction of claim 1, wherein said cover is constructed for transferring shear forces.

11. The aircraft construction of claim 1, wherein said first and second areas have approximately equal shear moduli.

* * * * *